United States Patent [19]

Hasegawa et al.

[11] Patent Number: 5,090,540
[45] Date of Patent: Feb. 25, 1992

[54] SHIFT RANGE DEVICE FOR AUTOMATIC TRANSMISSION

[75] Inventors: Hiromi Hasegawa, Obu; Toshiaki Ishiguro, Chita, both of Japan

[73] Assignee: Aisin Seiki Kabushiki Kaisha, Kariya, Japan

[21] Appl. No.: 660,856

[22] Filed: Feb. 26, 1991

[30] Foreign Application Priority Data

Feb. 28, 1990 [JP] Japan ................... 2-18721

[51] Int. Cl.⁵ ............................... G05G 3/00
[52] U.S. Cl. ...................... 192/87.19; 74/473 R; 74/335
[58] Field of Search .............. 74/335, 476 R, 878; 192/87.19

[56] References Cited

U.S. PATENT DOCUMENTS

| | | | |
|---|---|---|---|
| 3,001,618 | 9/1961 | McCordic et al. | 74/473 |
| 3,498,155 | 3/1970 | Ivanchich et al. | 74/473 |
| 3,583,184 | 6/1971 | Papale | 74/473 X |
| 3,650,161 | 3/1972 | Ito et al. | 74/335 X |
| 3,998,110 | 12/1976 | O'Brien et al. | 74/473 R X |
| 4,118,999 | 10/1978 | Bieber | 74/475 |
| 4,631,984 | 12/1986 | Jones | 74/878 |

Primary Examiner—Allan D. Herrmann
Assistant Examiner—Ryan W. Massey
Attorney, Agent, or Firm—Burns, Doane, Swecker & Mathis

[57] ABSTRACT

A shift range device for an automatic transmission a shift lever shiftable to any one of a first neutral range, a reverse range, a second neutral range and one or more drive ranges which are arranged in the identified order. A neutral device includes a manual valve connected to the shift lever for establishing the neutral condition in such a manner that the manual valve inhibits the supply of oil pressure to any one of frictional engaging elements of the automatic transmission when the shift lever is transferred to the first neutral position or the second neutral position.

2 Claims, 3 Drawing Sheets

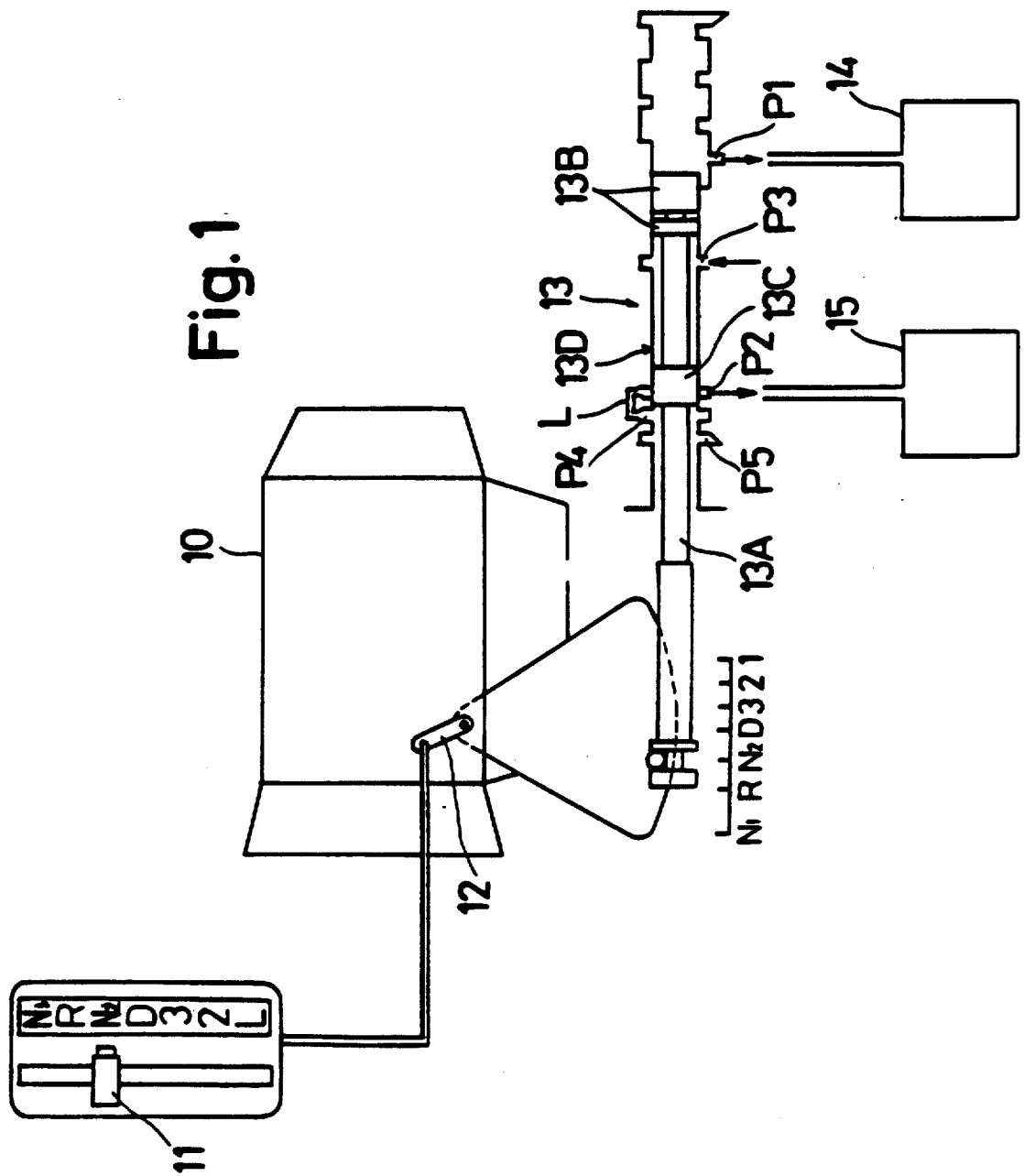

SHIFT RANGE DEVICE FOR AUTOMATIC TRANSMISSION

BACKGROUND OF THE INVENTION

1. Field of the Invention

This invention relates to a shift range device for an automatic transmission used in an automotive vehicle and more particularly to a shift range device for an automatic transmission used in an automotive vehicle such as a truck or a bus and which is not provided with a park position of the shift range.

2. Description of the Related Art

An automatic transmission for relatively a small size automotive vehicle, such as a private car, is generally provided with a parking position "P" at an upper end of a shift position of a shift range selector device. A parking mechanism which is operable corresponding to the operation of a shift lever, as shown in FIG. 3, is disclosed in Japanese Laid Open Patent No. 59-184049 published without examination in 1984. When the shift lever (not shown) is shifted to the park position "P", the shift lever is connected to a lever 1 and a rod 2 by a link mechanism (not shown). The lever 1 and the rod 2 are moved in the leftward direction in FIG. 3 in response to the operation of the shift lever (not shown). Thereby, a pawl 4 having an engaging portion is moved in the upper direction by a cam 3 which is formed at one end of the rod 2. Accordingly, the engaging portion of the pawl 4 is engaged with a parking gear (not shown). As a result, the shift change into the park position "P" is completed.

However, an automotive vehicle of large size like a truck and a bus cannot be provided with the foregoing parking mechanism because of insufficient mechanical strength of the engaging portion with the cam 3. Thus, as shown in FIG. 4, a shift range device which is disclosed in "MOTOR VEHICLE" VOL. 39, September 1989 is not provided with the park position "P", and also an example of the shift range device which is not provided with the park position "P" is disclosed in "HT700D Series Service Manual" published in March, 1976 by Allison Diesel Company.

However, the foregoing conventional shift range device has the following problem. Namely, when the shift selector lever 5 is shifted to the upper end position in FIG. 4, the shift position is shifted to a reverse position "R". Therefore, there is a fear that the car would suddenly move in the backward direction if the driver does not depress a brake pedal (not shown).

SUMMARY OF THE PRESENT INVENTION

It is an object of the invention to provide an improved shift range device for an automatic transmission which obviates the above-described drawbacks.

In order to accomplish the object, a shift range device for automatic transmissions includes a shift lever to be shifted to any one of a first neutral range, a reverse range, a second neutral range and one or more drive ranges which are arranged in the identified foregoing order, and a neutral device including a manual valve connected to the shift lever for establishing the neutral condition in such a manner that the manual valve inhibits the supply of the oil pressure to any of the friction engaging elements of the automatic transmission when the shift lever is shifted to the first neutral position or the second neutral position.

BRIEF DESCRIPTION OF THE DRAWINGS

FIG. 1 shows an organizational view illustrated an embodiment of the invention.

DETAILED DESCRIPTION OF PREFERRED EMBODIMENTS OF THE INVENTION

Figure 2A:
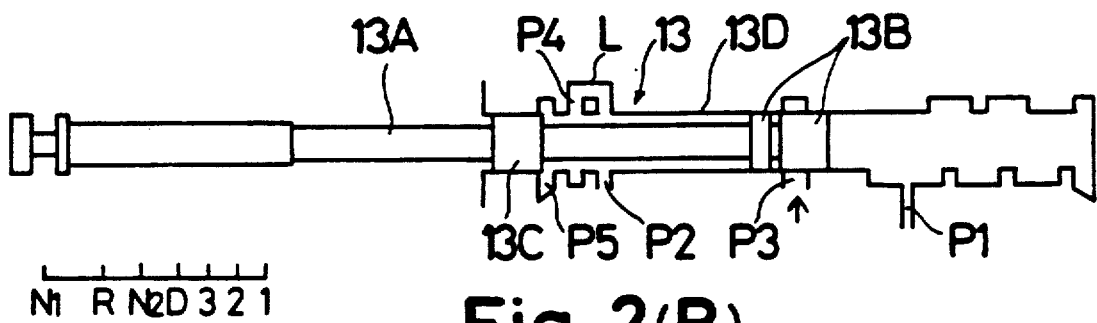
FIGS. 2(A) and 2(D) show operational views of manual valve of the invention.

Referring to FIG. 1, a shift lever 11 is provided at a position near the driver's seat of a vehicle. A shift lever 11 is shifted to any one of a first neutral range N1, a reverse range R, a second neutral range N2 and one or more drive ranges D, 3, 2, L. All ranges being arranged in the identified order.

The shift lever 11 is connected to one end of a spool 13A of a manual valve 13 by a lever 12. The manual valve 13 is arranged in an oil pressure control circuit (not shown) of an automatic transmission 10. The spool 13A includes a first land 13B which is positioned at a first end of the spool and a second land 13C which is positioned intermediate of the spool.

A valve body 13D of the manual valve 13 includes a first oil pressure outlet port P1 which is connected to a forward clutch 14 so as to actuate a first set of friction engaging elements, a second oil pressure outlet port P2 which is connected to a reverse clutch 15 so as to actuate a second set of friction engaging elements, a line oil pressure input port P3, a connecting port P4 which is connected to the second oil pressure outlet port P2 through an oil line L and, a drain port P5.

The operation of an above-mentioned embodiment will be described below.

Figure 2B:
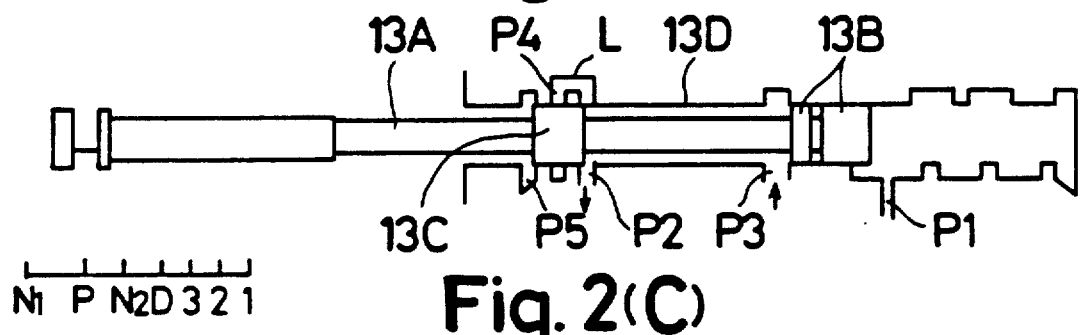
Figure 2C:
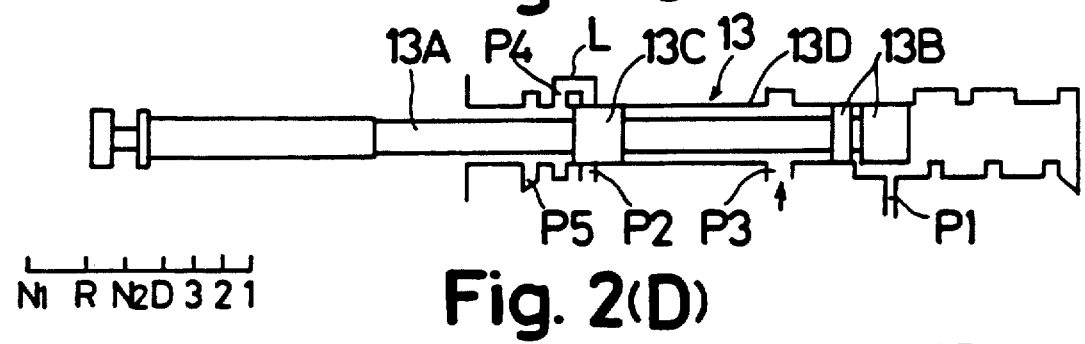

When the shift lever 11 is shifted to the second neutral position N2 as illustrated in FIG. 1 and FIG. 2(C), the first land 13B of the spool 13A prevents the line oil pressure inlet port P3 from communicating with the first oil pressure outlet port P1. On the other hand, the second land 13C prevents the line oil pressure inlet port P3 from communicating with the second oil pressure outlet port P2. Consequently, line oil pressure which is supplied from the oil line pressure inlet port P3 is not transmitted to either of the clutches 14 and 15.

In the case that the shift lever 11 is shifted to the first neutral position N1 as illustrated in FIG. 2(A), the spool 13A is moved in the leftward direction. Therefore, the line oil pressure inlet port P3 is closed by the first land 13B. Thus, line oil pressure which is supplied from the oil line pressure inlet port P3 is not transmitted to either of the clutches 14 and 15.

In case the shift lever 11 is shifted to the reverse position R as illustrated in FIG. 2(B), the line oil pressure inlet port P3 is communicated with the second oil pressure outlet port P2 which is connected to the reverse clutch 15. Thus, line oil pressure which is supplied from the oil line pressure inlet port P3 is transmitted to the reverse clutch 15.

Figure 2D:
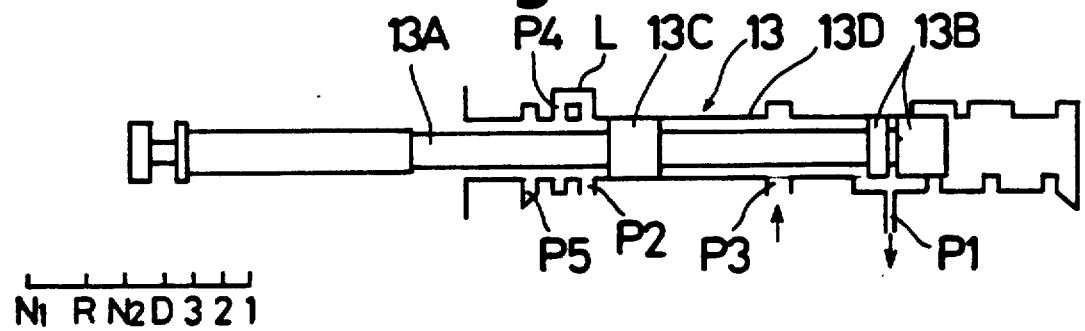
Figure 3:
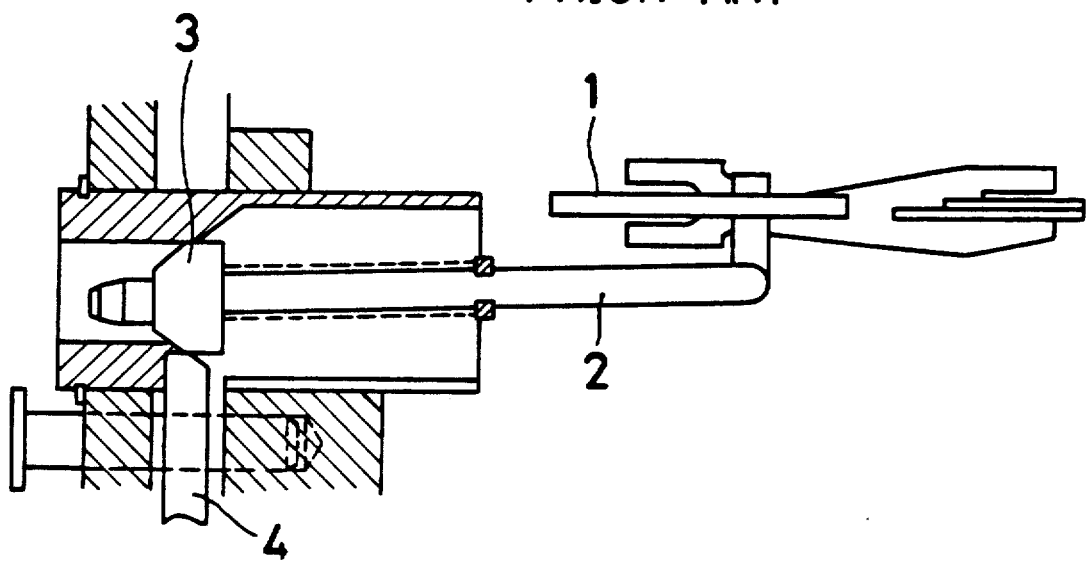
FIG. 3 shows a partial cross-sectional view of a parking mechanism of the Prior Art.
Figure 4:
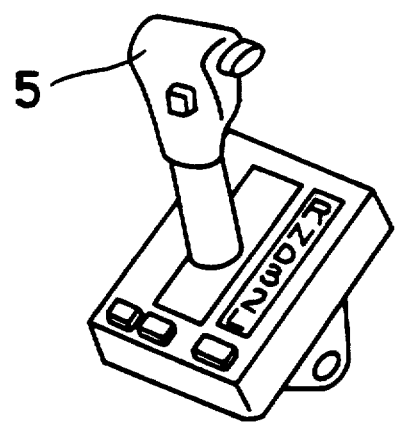
FIG. 4 shows a view illustrating a shift range device of the Prior Art.

When the shift lever 11 is shifted to the drive position D, 3, 2, L as illustrated in FIG. 2(D), the spool 13A is moved further in the rightward direction than the position of the spool 13A in FIG. 2(C). Thereby, the line oil pressure which is supplied from the oil line pressure inlet port P3 is transmitted to the forward clutch 14.

From the foregoing, it is understood that the shift range device inhibits oil pressure supplied from the manual valve 13 from being transmitted to either of the clutches 14 and 15 of an automatic transmission even if the driver shifts the shift position 11 to the first neutral position N1 by oversight. Consequently, the vehicle is prevented from suddenly moving backward.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A shift range device for an automatic transmission comprising:
    a shift range means including a shift lever shiftable to any one of a first neutral range, a reverse range, a second neutral range and one or more drive ranges arranged in the identified order; and
    neutral means including a manual valve connected to said shift lever for establishing a neutral condition of the transmission so that said manual valve inhibits supply of oil pressure to any friction engaging elements of said transmission when said shift lever is shifted to one of said first neutral position and said second neutral position.

2. A shift range device for an automatic transmission according to claim 1, wherein said manual valve includes a spool having a first land positioned at one end thereof and a second land positioned intermediate thereof, an oil pressure outlet port connected to a forward clutch, an oil pressure outlet port connected to a reverse clutch, a line oil pressure inlet port, a connecting port connected to said oil pressure outlet port to said reverse clutch through an oil line and a drain port, said manual valve inhibiting said line oil pressure inlet port from communicating with said oil pressure outlet port by said second land when said shift lever is shifted to said second neutral range, and said manual valve inhibiting supply of said line oil pressure into said line oil pressure inlet port by said first land when said shift lever is shifted to said first neutral range.

* * * * *